United States Patent
Hartshorne et al.

(10) Patent No.: US 9,857,487 B2
(45) Date of Patent: Jan. 2, 2018

(54) SOLID MARINE SEISMIC STREAMERS

(71) Applicant: WESTERNGECO L.L.C., Houston, TX (US)

(72) Inventors: Robert Seth Hartshorne, Cambridge (GB); Anders Nesheim, Asker (NO); Steven Antony Gahlings, Cambridge (GB); Gary John Tustin, Sawston (GB)

(73) Assignee: WESTERNGECO LLC, Houston, TX (US)

( * ) Notice: Subject to any disclaimer, the term of this patent is extended or adjusted under 35 U.S.C. 154(b) by 0 days.

(21) Appl. No.: 14/432,765

(22) PCT Filed: Sep. 30, 2013

(86) PCT No.: PCT/IB2013/059010
§ 371 (c)(1),
(2) Date: Apr. 1, 2015

(87) PCT Pub. No.: WO2014/053984
PCT Pub. Date: Apr. 10, 2014

(65) Prior Publication Data
US 2015/0253442 A1 Sep. 10, 2015

Related U.S. Application Data

(60) Provisional application No. 61/708,355, filed on Oct. 1, 2012, provisional application No. 61/708,369, filed
(Continued)

(51) Int. Cl.
*G01V 1/20* (2006.01)
*G01V 1/38* (2006.01)
(Continued)

(52) U.S. Cl.
CPC .......... *G01V 1/201* (2013.01); *B29C 47/025* (2013.01); *B29C 47/065* (2013.01); *B29D 23/00* (2013.01);
(Continued)

(58) Field of Classification Search
CPC .......... G01V 1/201; G01V 1/38; G01V 13/00; B29C 47/025; B29C 47/065; B29D 23/00;
(Continued)

(56) References Cited

U.S. PATENT DOCUMENTS 4,064,338 A   12/1977   Russell
5,331,074 A   7/1994    Slater et al.
(Continued)

FOREIGN PATENT DOCUMENTS

CN   1661731 A     8/2005
CN   101157750 A   4/2008
(Continued)

OTHER PUBLICATIONS

Kraton Polymers, Processing Guide K01070Tc-00U (Supercedes SC: 455-98) 3M 6/00.*
(Continued)

*Primary Examiner* — James Hulka
*Assistant Examiner* — John T Nolan (57) ABSTRACT

A marine seismic streamer comprising a solid, hydrophobic core member that is encased in a hydrophobic streamer skin/casing. The hydrophobic streamer skin may be extruded onto and/or heat welded to the hydrophobic core member. The hydrophobic streamer skin/casing may comprise a thermoplastic polyurethane that includes fluorine and/or silicon moieties, silicon, polydimethylsiloxane or the like. The hydrophobic streamer skin/casing may reduce the drag of the streamer and may provide anti-biofouling prop-
(Continued)

erties to the streamer. A hydrophobic paint, coating or polymer may in some instances be disposed on top of the hydrophobic streamer skin/casing.

20 Claims, 8 Drawing Sheets

Related U.S. Application Data on Oct. 1, 2012, provisional application No. 61/708,377, filed on Oct. 1, 2012.

(51) Int. Cl.

| G01V 13/00 | (2006.01) |
| --- | --- |
| B29C 47/02 | (2006.01) |
| B29C 47/06 | (2006.01) |
| B29D 23/00 | (2006.01) |
| B29K 75/00 | (2006.01) |
| B29K 83/00 | (2006.01) |

(52) U.S. Cl.
CPC ............... *G01V 1/38* (2013.01); *G01V 13/00* (2013.01); *B29K 2075/00* (2013.01); *B29K 2083/00* (2013.01); *B29K 2995/0093* (2013.01)

(58) Field of Classification Search
CPC ............ B29K 2075/00; B29K 2083/00; B29K 2995/0093
USPC .......................................................... 367/154
See application file for complete search history.

(56) References Cited

U.S. PATENT DOCUMENTS

| 5,449,553 | A | 9/1995 | Griffith |
| --- | --- | --- | --- |
| 5,514,731 | A | 5/1996 | Nakai |
| 5,637,772 | A | 6/1997 | Malik et al. |
| 5,691,019 | A | 11/1997 | Carroll et al. |
| 5,904,988 | A | 5/1999 | Stein et al. |
| 5,906,893 | A | 5/1999 | Stein |
| 6,020,026 | A | 2/2000 | Birch et al. |
| 6,048,580 | A | 4/2000 | Carter et al. |
| 6,101,973 | A | 8/2000 | Stewart et al. |
| 6,221,498 | B1 | 4/2001 | Takahama et al. |
| 6,313,335 | B1 | 11/2001 | Roberts et al. |
| 6,403,105 | B1 | 6/2002 | Stein |
| 7,693,005 | B2 | 4/2010 | Stenzel et al. |
| 7,835,222 | B2 | 11/2010 | Lobe et al. |
| 2001/0032568 | A1 | 10/2001 | Schutt |
| 2001/0034413 | A1 | 10/2001 | Hanada et al. |
| 2001/0051274 | A1 | 12/2001 | Alberte et al. |
| 2005/0255251 | A1 | 11/2005 | Hodge et al. |
| 2006/0002234 | A1 | 1/2006 | Lobe et al. |
| 2006/0022020 | A1 | 2/2006 | Schulz-Harder |
| 2006/0135709 | A1 | 6/2006 | Hasegawa et al. |
| 2006/0167206 | A1 | 7/2006 | Maier et al. |
| 2007/0201307 | A1* | 8/2007 | Lobe ...................... G01V 1/201 367/20 |
| 2008/0090938 | A1 | 4/2008 | Quaiser et al. |
| 2008/0145631 | A1* | 6/2008 | Bhate ...................... B08B 17/06 428/220 |
| 2008/0186803 | A1 | 8/2008 | McKey et al. |
| 2009/0068473 | A1 | 3/2009 | Van Wessel et al. |
| 2010/0020644 | A1* | 1/2010 | Vignaux ................ G01V 1/201 367/154 |
| 2010/0061189 | A1 | 3/2010 | Stenzel et al. |
| 2011/0120745 | A1 | 5/2011 | Booth et al. |
| 2013/0003497 | A1 | 1/2013 | Elboth |
| 2013/0039153 | A1* | 2/2013 | Hartshorne ............. B63B 59/04 367/153 |
| 2013/0142013 | A1* | 6/2013 | Hartshorne ............. B63B 59/04 367/153 |
| 2013/0170322 | A1* | 7/2013 | Hartshorne ............. B63B 59/04 367/154 |
| 2014/0041450 | A1* | 2/2014 | Macquin ................ G01V 1/3843 73/431 |

FOREIGN PATENT DOCUMENTS

| CN | 101775117 A | 7/2010 | |
| --- | --- | --- | --- |
| EP | 2324984 A1 | 5/2011 | |
| EP | 2324984 B1 | 5/2012 | |
| GB | 2492316 A | 1/2013 | |
| JP | 6424823 A | 1/1989 | |
| JP | 6445878 A | 2/1989 | |
| JP | 912413 A | 1/1997 | |
| JP | 9183199 A | 7/1997 | |
| KR | 0159478 B1 | 12/1998 | |
| WO | 9926992 A1 | 6/1999 | |
| WO | 2006/005045 A2 | 1/2006 | |
| WO | 2011070412 A2 | 6/2011 | |
| WO | WO 2011/070411 A2 * | 6/2011 | ............... G01V 1/38 |
| WO | 2011070412 A3 | 11/2011 | |
| WO | 2011070411 A3 | 12/2011 | |

OTHER PUBLICATIONS

Polydimethylsiloxane—Wikipedia entry (8 pages). (Provided under U.S. Appl. No. 13/553,588).

Polytetrafluoroethylene—Wikipedia entry (8 pages). (Provided under U.S. Appl. No. 13/553,588).

Chunfeng Ma, Yi Hou, Shi Liu, and Guangzhao Zhang, "Effect of Microphase Separation on the Protein Resistance of a Polymeric Surface", Langmuir 2009, 25 (16), 9467-9472. (Provided under U.S. Appl. No. 13/553,588).

First Office Action of Chinese Application No. 201080063694.3 dated Feb. 7, 2014, pp. 1-10. (Provided under U.S. Appl. No. 13/553,588).

Brady, et al., "Mechanical Factors Favoring Release From Fouling Release Coatings," Biofouling, vol. 15, Issues 1-3, 2000, pp. 73-81. (Provided under U.S. Appl. No. 13/553,588).

Estarlich, et al., "The Surface Properties of Some Silicone and Fluorosilicone Coating Materials Immersed in Seawater," Biofouling, vol. 16, Issues 2-4, 2000, pp. 263-275. (Provided under U.S. Appl. No. 13/553,588).

Evans, "TBT or Not TBT?: That is the Question," Biofouling, vol. 14, Issue 2, 1999, pp. 117-129. (Provided under U.S. Appl. No. 13/553,588).

Kissa, "Structure of Fluorinated Surfactants," Fluorinated Surfactants: Synthesis, Properties, Applications, Marcel Dekker, New York, 1994, Chapter 1, pp. 1-21. (Provided under U.S. Appl. No. 13/553,588).

Madkour, et al., "Towards Self-Sterilizing Medical Devices: Controlling Infection," Polymer International, vol. 57, 2008, pp. 6-10. (Provided under U.S. Appl. No. 13/553,588).

Majumdar, et al., "Combinatorial Materials Research Applied to the Development of New Surface Coating IX: An Investigation of Novel Antifouling/Fouling-Release Coatings Containing Quaternary Ammonium Salt Groups," Biofouling, vol. 24, No. 3, 2008, pp. 185-200. (Provided under U.S. Appl. No. 13/553,588).

Malshe, et al., "Fluorinated Acrylic Copolymers. Part I: Study of Clear Coatings," Progess in Organic Coatings, vol. 53, pp. 207-211. (Provided under U.S. Appl. No. 13/553,588).

Waterman, et al., "Performance and Effectiveness of Non-Stick Coatings in Seawater," Biofouling, vol. 11, Issue 2, 1997, pp. 101-118. (Provided under U.S. Appl. No. 13/553,588).

Wynne, et al., "Two Silicone Nontoxic Fouling Release Coatings: Hydrosilation Cured PDMS and CaCO3 Filled Ethoxysiloxane Cured RTV11," Biofouling, vol. 16, Issues 2-4, 2000, pp. 277-288. (Provided under U.S. Appl. No. 13/553,588).

First Office Action of Chinese Application No. 201080063691.X, dated Jul. 3, 2014, 9 pages. (Provided under U.S. Appl. No. 13/553,588).

(56) References Cited

OTHER PUBLICATIONS

Combined Search and Examination Report issued in United Kingdon Application No. 1110087.2, dated Oct. 14, 2011, 20 pages. (Provided under U.S. Appl. No. 13/553,588).
International Search Report and Written Opinion issued in PCT/US2012/041473, dated Jan. 31, 2013, 13 pages. (Provided under U.S. Appl. No. 13/553,588).
International Search Report and Written Opinion issued in PCT/IB2010/002929, dated Aug. 23, 2011, 8 pages. (Provided under U.S. Appl. No. 13/553,588).
International Search Report and Written Opinion issued in PCT/IB2010/002928, dated Sep. 23, 2011, 8 pages. (Provided under U.S. Appl. No. 13/553,588).
International Search Report and Written Opinion for corresponding PCT Application Serial No. PCT/IB2013/059010, dated Mar. 11, 2014, 13 pages.
International Search Report and Written Opinion for related PCT Application Serial No. PCT/IB2013/059009 dated Mar. 11, 2014, 15 pages.
Chattopadhyay, Dipak Kumar, and K. V. S. N. Raju. "Structural engineering of polyurethane coatings for high performance applications." Progress in polymer science 32.3 (2007): 352-418.

* cited by examiner

SOLID MARINE SEISMIC STREAMERS

BACKGROUND

This disclosure relates generally to seismic streamers/seismic cables for use in marine seismic surveys, and more specifically but not by way of limitation to streamers with a solid/rigid core and anti-biofouling properties.

Seismic exploration involves surveying subterranean geological formations for hydrocarbon deposits. A seismic survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing the direction of propagation and other properties of the seismic waves. Part of the energy emitted by the sources reaches the seismic sensors. Some seismic sensors are sensitive to pressure changes (e.g., hydrophones), others to particle motion (e.g., geophones), and/or the like. In response to the detected seismic events, the sensors generate electrical signals to produce seismic data. Analysis of the seismic data can then indicate the presence or absence of probable locations of hydrocarbon deposits.

Figure 1A:
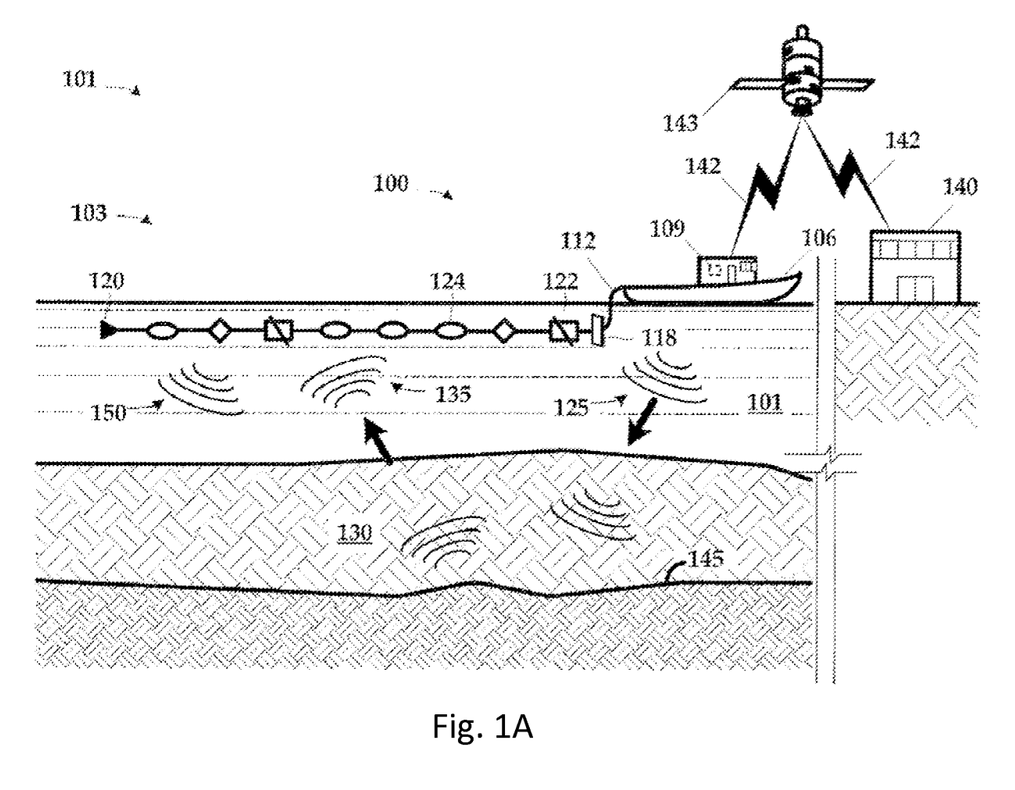
FIGS. 1A and 1B illustrate a marine seismic survey using seismic streamers.
Figure 1B:
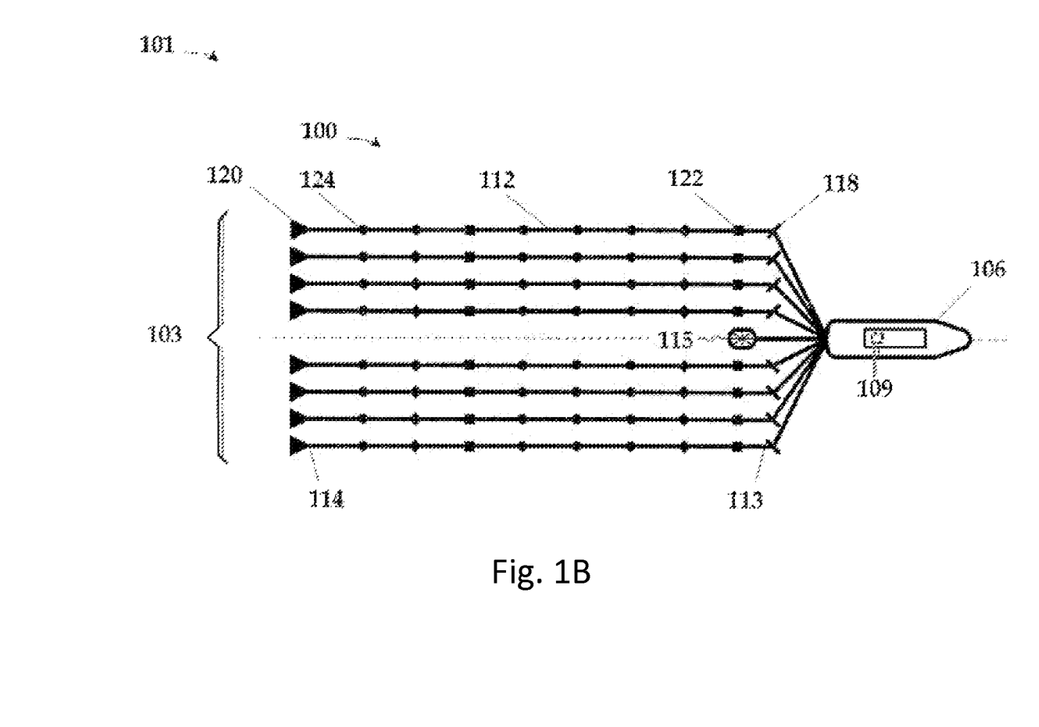

In a marine seismic survey, the equipment for which and arrangement of such equipment is depicted in FIGS. 1A and 1B, a survey vessel tows an array of seismic cables, frequently referred to as a "streamer," along a predetermined course. As the vessel tows the array, a seismic source, such as an airgun or a vibrose is source, imparts an acoustic wave into the water. The acoustic wave travels through the water and is eventually reflected by various geological features. The reflections travel back up through the water to the streamers and these reflections are referred to herein as a seismic signal.

The streamers include sensors for detecting/determining properties of the reflections/seismic signals. These sensors may include acoustic sensors, or "hydrophones," distribute along the length of the streamer. In a seismic survey, the acoustic receivers may be used to sense the magnitude of the passing wavefront of the reflections/seismic signals. The acoustic receivers then transmit data representing the detected magnitude of the passing wavefront back up the seismic cables to the survey vessel for collection. The streamer may comprise other types of sensors for sensing other properties of the seismic signals.

The survey system 100 may include an array 103 towed by a survey vessel 106 on board of which is a computing apparatus 109. The towed array 103 may comprise multiple marine seismic cables, or streamers, 112 (only one is shown in the figure) that may, for instance, each be of the order of multiple kilometers in length. Note that the number of streamers 112 in the towed array 103 is not material to the practice of the invention. Thus, alternative embodiments may employ different numbers of streamers 112.

A seismic source 115, typically an air gun or an array of air guns, is also shown being towed by the seismic survey vessel 106. Note that in alternative embodiments, the seismic source 115 may not be towed by the survey vessel 106. Instead, the seismic source 115 may be towed by a second vessel (not shown), suspended from a buoy (also not shown), or deployed in some other fashion known to the art. The known seismic sources include impulse sources, such as explosives and air guns, and vibratory sources which emit waves with a more controllable amplitude and frequency spectrum.

At the front of each streamer 112 is a deflector 118 (only one indicated) and at the rear of every streamer 112 is a tail buoy 120 (only one indicated). The deflector 118 horizontally positions the front end 113 of the streamer 112 nearest the seismic survey vessel 106. The tail buoy 120 creates drag at the tail end 114 of the streamer 112 farthest from the seismic survey vessel 106. The tension created on the streamer 112 by the deflector 118 and the tail buoy 120 results in a roughly linear shape of the streamer 112, shown in FIG. 1B.

Located between the deflector 118 and the tail buoy 120 are a plurality of seismic cable positioning devices known as "birds" 122. The birds 122 may be located at regular intervals along the seismic cable, such as every 200 to 400 meters. The birds 122 are used to control the depth at which the streamers 112 are towed, typically of the order of a few meters.

Seismic surveys may be called "marine" surveys because they are conducted in marine environments. In the marine seismic survey, the streamers that are used comprise long cables that house various sensor networks and other devices useful in the acquisition of seismic data. Generally, the streamers comprise liquid-filled streamers where the liquid is selected to have advantageous properties for seismic signal acquisition. Often, the liquid filling the streamer comprises kerosene. However, a problem with kerosene filled streamers is that if the streamer is punctured the kerosene may leak out and pollute the marine environment. As a result, some streamers are fabricated with a gel filler, which may comprise a kerosene gel or the like, which addresses the problem of leaking. Liquid and gel filled streamers may be used to provide for good data acquisition from the marine environment surrounding the streamer and/or to provide that the streamer is flexible so it can be stored on a spool when not deployed from the seismic vessel.

Within the core of the streamer, transmission and power bundles are disposed continuously through a streamer section (a segmented portion./.section of a streamer cable). The transmission and power bundles are typically connected to electronics modules between the streamer sections through end-connectors. Also within a streamer section, there is a need to connect distributed sensors and (if present) sensor electronics by wires to transmit power and data to the electronics modules.

Previously, seismic streamers have in general comprised sensors, strength members and cabling all disposed within a polyurethane casing, which may be referred to as the streamer skin/streamer casing. The casing for seismic streamers, the streamer skin, in general, is and has previously been made from thermoplastic polyurethane ("TPU"). TPU is any of a class of a polyurethane plastic.

In general, TPU has been used as a streamer casing material because it has many useful properties, including elasticity, transparency, and resistance to oil, grease and abrasion. TPU comprises thermoplastic elastomers consisting of linear segmented block copolymers composed of hard and soft segments. TPU is formed by the reaction of: (1) diisocyanates with short-chain diols (so-called chain extenders) and (2) diisocyanates with long-chain bifunctional diols (known as polyols). With TPU, there is virtually an unlimited amount of possible combinations producible by varying the structure and/or molecular weight of the reaction compounds allowing for an enormous variety of different TPUs. The different TPU recipes have allowed for tuning the TPU's polymer structure to the desired final properties of the resulting TPU for use in seismic streamers. For example TPU may be tuned to have a desired resistance to abrasion, opacity, attenuation/lack of attenuation of seismic signals, noise and/or the like. Moreover, TPU is a hydrophilic material and this property has been useful for effectively encapsulating the liquid and gel fillers used in the streamers, where the liquid/gel, in general, comprises kerosene or the like.

SUMMARY

In an embodiment of the present disclosure, a seismic streamer is provided that comprises a solid/rigid, hydrophobic body coupled with a hydrophobic streamer casing. The solid streamer body may comprise a hollow cylinder and in some aspects there may be holes/pockets/wells in the body in which seismic sensors may be positioned. The solid body may support the streamer and contain the seismic streamers and electronics for detecting and/or processing seismic signals in a marine environment. The seismic body may have a rigidity/elastic modulus that provides for supporting the streamer structure and that provides for spooling the streamer onto a spool on a seismic vessel.

In an embodiment of the present disclosure, the seismic streamer may be made of hydrophobic solid materials, such as polyethylene, polypropylene, polytetrafluoroethylene and thermoplastic polyurethane comprising silicon and/or fluorine moieties. In embodiments of the present disclosure, the solid, hydrophobic body does not comprise a liquid or a gel. The streamer casing may comprises silicon, a silicone-elastomer, a polydimethylsiloxane or a thermoplastic polyurethane that comprises silicon and/or fluorine moieties. Because the streamer has a solid core/body and the streamer casing is disposed over this solid core/body, the streamer casing, in accordance with an embodiment of the present disclosure, may have a low elastic modulus. For example, silicon or PDMS casings may be used having an elastic modulus of less than 10 or 5 MPa or of the order of 1 MPa. These low elastic moduli provide for a soft/springy surface that may prevent bio-fouling of the surface by some marine species.

In an embodiment of the present disclosure, at least a portion of the streamer casing may be heat welded to the streamer body and/or extruded onto the streamer body. Where sensors are positioned in gels or fluids in pockets in the solid streamer core, the streamer casing may be coupled to the streamer core so as to seal the fluid/gel in the pocket.

In some embodiments, the casing may comprise a sleeve of hydrophobic material, such as silicon or PDMS, that may surround at least a portion of the solid streamer core. The streamer may be manufactured by inserting the streamer core into a tube of the streamer casing, by extruding the casing onto the streamer core and/or the like.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DESCRIPTION

The ensuing description provides some embodiment(s) of the invention, and is not intended to limit the scope, applicability or configuration of the invention or inventions. Various changes may be made in the function and arrangement of elements without departing from the scope of the invention as set forth herein. Some embodiments maybe practiced without all the specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Some embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure and may start or end at any step or block. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Figure 2:
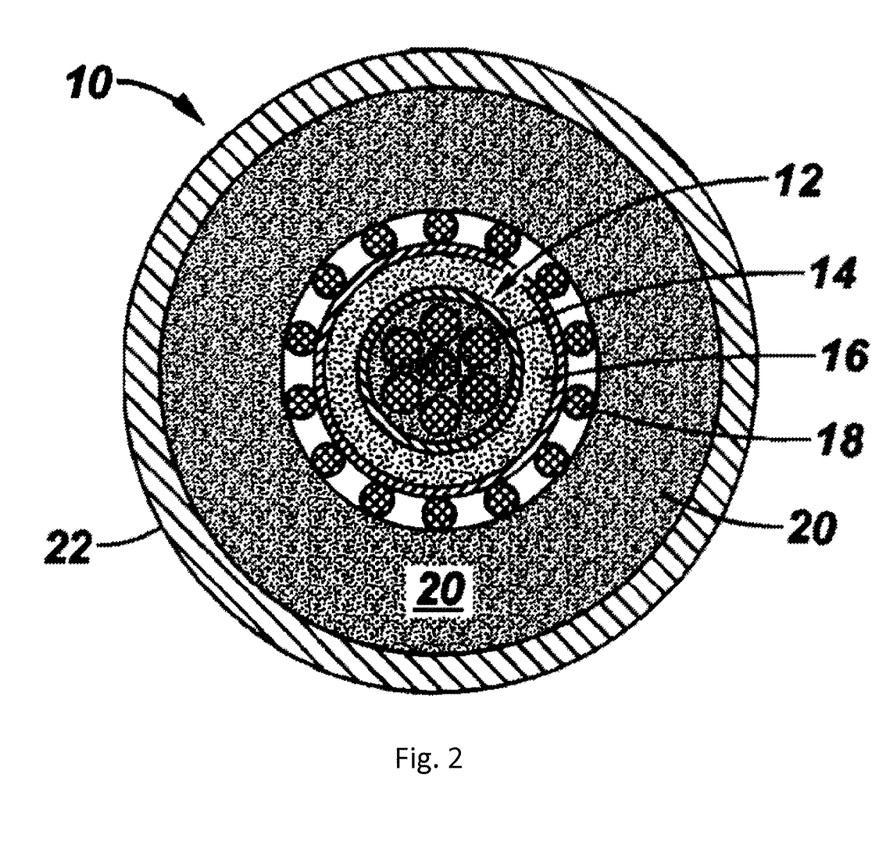
FIG. 2 illustrates a cross section of a solid streamer cable 10 with anti-biofouling properties, in accordance with one embodiment of the present disclosure.

FIG. 2 is a cross section of a solid streamer cable 10 with anti-biofouling properties, in accordance with one embodiment of the present disclosure. Solid streamer cable 10 includes a central core 12 having transmission bundle 14 surrounded by a strength member 16. Central core 12 is typically pre-fabricated before adding sensors and/or sensor electronics. Local wiring 18, which is used to connect the sensor and sensor electronics, is also disposed in streamer cable 10 inside of a polymer body 20 and a skin 22. The polymer body 20 comprises a polymer material, plastic material and/or the like having rigid or semi-rigid properties and provides the rigidity/solidity of the solid streamer cable 10. The polymer/plastic of the polymer body 20 may be selected so that while the solid streamer cable 10 is rigid, it can still be wound around a spool so it can be stored on and deployed from a seismic vessel.

The polymer body 20 may in some aspects be configured so that the central core 12 and/or the strength member 16 are not required. For example, in some embodiments, the solid streamer cable 10 may comprise simply the polymer body 20 with a central cavity in which the transmission bundle 14 is disposed. In such aspects, the strength member is not necessary. The typical way to dispose wiring 18 within streamer cable 10 is to twist the wiring onto the central core 12 with a certain lay-length (or pitch) to allow for tensile cycling and bending of streamer cable 10 without generating high stresses in the wires.

In accordance with an embodiment of the present invention, the polymer body 20 has hydrophobic properties. In some aspects, the hydrophobic properties may be provided by incorporating fluorine and/or silicon moieties or derivatives thereof into the polymer/plastic forming the polymer body 20. In other aspects, the polymer/plastic forming the polymer body 20 may be selected to be hydrophobic in nature. In some embodiments of the present invention, the skin 22 may also have hydrophobic properties. The hydrophobic properties of the skin 22 may be provided by incorporating fluorine and/or silicon moieties and/or derivatives thereof into the polymer forming the skin 22. For example, the polymer body 20 and/or the skin 22 may comprise TPU with fluorine and/or silicon moieties and/or derivatives thereof attached to the backbone of the TPU structure. In some aspects the skin 22 may comprise silicon, polydimethylsiloxane ("PDMS") and/or the like.

Hydrophobic moieties, such as fluorine, fluorine derivatives, silicon, silicon derivatives, PDMS and/or the like have been found to have anti-biofouling properties. However, Applicants have found that hydrophobicity is not the only factor in reducing biofouling, especially with respect to fouling by arthropods, such as barnacles or the like. Applicants have found that the elasticity/elastic modulus of the hydrophobic material is also a factor and softer, springier, elastic materials may be better at preventing fouling by arthropods or the like. In embodiments of the present invention, the skin 22 may comprise an elastic material, such as PDMS or the like. In such embodiments, the polymer body 20 may provide the strength of the solid streamer cable 10 to provide desirable streamer properties where the skin 22 is elastic, compliant and/or not durable by itself.

The solid streamer cable 10 may be manufactured by extruding the skin 22 over the polymer body 20, inserting the polymer body 20 into a cylinder of the skin 22 or by a like method. In some aspects, portions of the skin 22 may be welded to the polymer body 20, such as by thermal welding, to provide for integration of the polymer body 20 and the skin 22, to produce pockets in the combined polymer body 20-skin 22 and/or the like. In embodiments of the present invention wherein the polymer body 20 and the skin 22 are both hydrophobic, extrusion of the skin 22 onto the polymer body 20, insertion of the polymer body 20 into a cylinder of the skin 22, welding of the skin 22 to the polymer body 20, integration/coupling of the skin 22 with the polymer body 20 is improved. In some aspects, only an outer-surface of the polymer body 20 has hydrophobic properties. However, better manufacturing results may be produced where the entire polymer body 20 comprises hydrophobic properties. Manufacture of the solid streamer cable 10, integrity and/or durability of the manufactured solid streamer may be improved by use of two materials that are both hydrophobic In some embodiments, the polymer body 20 and the skin 22 are hydrophobic and an anti-biofouling paint and/or a coating may be applied to the skin 22. In aspects of the present invention, the anti-biofouling paint and/or the coating may comprise hydrophobic properties. It has been found that in use the anti-fouling paint/coating is more durable (remains coupled with the skin 22 and/or the polymer body 20) and retains its anti-fouling properties where the skin 22 and/or the polymer body 20 are hydrophobic. By contrast, where an antifouling coating is extruded onto or thermally bound with the skin 22 and/or the polymer body 20 and the skin 22 and/or the polymer body 20 is/are hydrophilic, the coating may begin to delaminate from the skin 22 and/or the polymer body 20 after only one or two uses in a seismic survey.

Some embodiments of the present invention provide a streamer that comprises the polymer body 20 and/or the skin 22, where the polymer body 20 and/or the skin 22 comprise a fluorinated or silicone-derivatised TPU. In some aspects, other compounds or derivatives thereof may be incorporated into the TPU to provide that the TPU is hydrophobic (has a low surface energy).

In embodiments of the present invention, incorporation of fluorine or silicone into the TPU backbone occurs during the polyurethane synthesis reaction and yields a chemically modified TPU that can be used to produce the skin 22 and/or the polymer body 20 with unaffected mechanical properties, but low surface energy. Applicants have found that even with the introduction of the silicon, fluorine and/or derivatives thereof into the TPU, it is possible to produce a TPU that: is abrasion resistant, is rigid/semi-rigid, has a stiffness that is applicable to transmission of seismic signals, can be extruded onto the polymer body 20, is transparent and/or the like.

In embodiments of the present invention, the modification of the base TPU provides for the direct application of anti-fouling paints and/or coatings that are strongly bound to the modified TPU. The strong bonding prevents the applied paint/coating becoming easily unattached from the streamer surface. Thus, the streamer exhibits better and more sustained anti-fouling properties. In fact, the improvement may be markedly improved, since effects such as flaking of paint, delamination of portions of a coating or the like may leave uneven surfaces on the skin 22 and/or the polymer body 20, which, contrary to the purpose of the paint/coating may serve to encourage marine fouling.

Figure 3A:
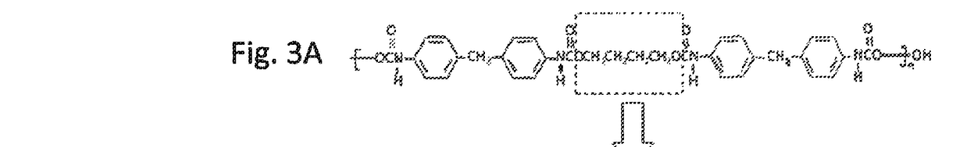
FIGS. 3A-C illustrate incorporation of a hydrophobic moiety into a polymer for use in a solid streamer as described in FIG. 2.
Figures 3B, 3C:
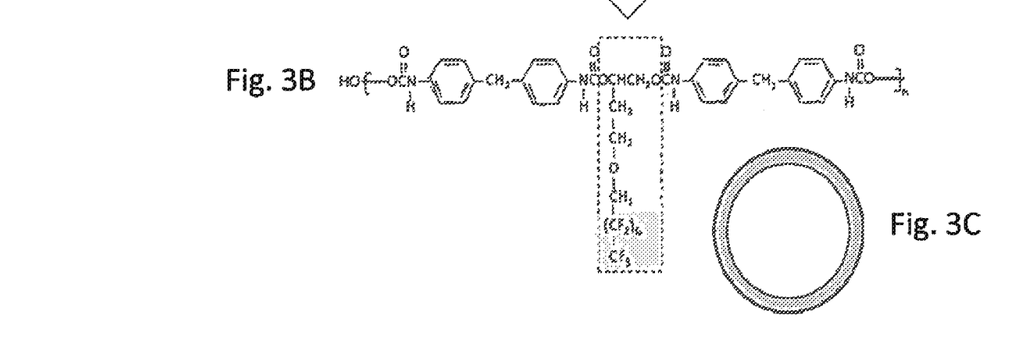

FIGS. 3A-C illustrate incorporation of a hydrophobic moiety into a polymer for use in a streamer as described in FIG. 2, in accordance with an embodiment of the present invention. In FIGS. 3A-C, a method of fluorine incorporation into a thermoplastic polyurethane block co-polymer is illustrated. In other embodiments, a silicon moiety or derivative thereof may be incorporated in the same manner as a fluorine moiety or derivative thereof.

As illustrated in FIGS. 3A-C, substitution of a typical chain extender (non-fluorinated) shown in FIG. 3A for a fluorinated chain extender shown in FIG. 3(b), yields a TPU material that can be extruded to produce a seismic streamer section, shown in FIG. 3C. The method disperses fluorine both through the bulk matrix of the streamer section and at the surface of the section. The modified (hydrophobic) surface imparts low surface energy properties to the seismic streamer making it suitable for the application of other hydrophobic materials, such as anti-fouling paints, coatings, laminates, tubing sections and/or the like.

In embodiments of the present invention, the skin 22 may be manufactured from melt-processable thermoplastic polyurethane (TPU) block co-polymer that can be extruded to form a self-supporting flexible tube. Thermoplastic polyurethanes are a versatile group of multi-phase segmented polymers that have excellent mechanical and elastic properties, good hardness and high abrasion and chemical resistance. Generally, polyurethane block copolymers are comprised of a low glass transition or low melting 'soft' segment and a rigid 'hard segment', which often has a glassy $T_g$ or crystalline melting point well above room temperature.

Thermoplastic polyurethanes used in seismic streamers are, generally, relatively hydrophilic materials, which is demonstrated by the fact that these materials have an air-water contact angle (θ) less than 90°.

Referring again to FIG. 2, in embodiments of the present invention, the integration of surface energy modifying materials into the chemistry of the skin 22 may be made during the production process and the skin 22 may then be extruded onto the polymer body 20. This manufacturing method allows for better more efficient manufacture of an anti-biofouling streamer. Moreover, the properties of coated streamer skins in accordance with embodiments of the present invention are much improved compared to the coating of regular, hydrophilic streamer skins with paints or top layers.

In embodiments of the present invention, it should be recognized that the modifying of the skin 22 by addition of silicon and/or fluoride or derivatives of these chemicals will itself impart some anti-fouling properties to the skin 22. However, in embodiments of the present invention, the mechanical properties, such as the Young's modulus of the skin 22, the opacity of the skin 22 etc. may be retained by adding only limited amounts of the silicon/fluoride or derivatives thereof. In embodiments of the present invention, these limited amounts may maintain the desired mechanical properties of the skin 22, but as a result may produce a surface with a hydrophobicity that is not as high as may be achieved using paints or coatings containing high levels of silicon or fluor-based polymers.

In embodiments of the present invention, the modified, low surface energy TPU is in effect tuned to be readily amenable to/configured with a low surface energy for being coated with the high-concentrate materials. In aspects of the present invention, the low surface TPU provides a material to which an outer-layer that is configured to have anti-biofouling properties can be attached. This use of a material that is conducive to attachment to attachment to an outer-layer configured to have anti-biofouling provides that the outer-surface of the low surface energy TPU does not have to be treated to provide for the attachment. This makes the process of producing the streamer more efficient and provides a more robust attachment between the TPU inner-layer and the anti-biofouling outer-layer than is possible by surface treating and/or use of tie coating attachment methods. As such, embodiments of the present invention provide streamer skins with good mechanical properties that can be effectively coated with paints and/or coatings containing high concentration of surface-energy lowering polymers.

Furthermore, in embodiments of the present disclosure, the rigidity/elasticity of the streamer skin 22 may not be as great of an issue as with non-solid streamers because the polymer body 20 may provide the strength/rigidity of the streamer. Accordingly, in some embodiments of the present invention, the skin 22 may be selected to have a high elasticity, compressibility and/or the like, which it has been found may increase anti-fouling properties of the streamer with respect to arthropods or the like. For example, the skin 22 or a coating applied to the skin 22 may comprise TPU highly doped with silicon, silicon, a silicon derivative, a silicon polymer—such as PDMS or the like—and/or the like.

Incorporation of silicon or fluorine into the TPU lowers the surface energy of the streamer by altering the wettability of the material. In certain aspects, two approaches may be used to provide for integration of silicon or fluorine can into the streamer skin. Firstly, the modifying agent of choice may be dispersed into the molten TPU during melt-processing/extrusion process. Generally, in streamer fabrication, TPU is melted and then extruded onto the streamer. In a dispersion method, in accordance with embodiments of the present invention, granules of the modifier, i.e., fluoroflake (a commercially available fluoro-carbon) can be added to a TPU batch mix to generate a 'physical blend' such that it is incorporated into the final material. The fluoro-carbon and the TPU interactions are purely physical as there are no covalent bonds formed between the two species during this process Alternatively, the use of hydrophobic chain extenders or polyols can be reacted with a pre-polymer to produce a 'hydrophobically-modified' thermoplastic polyurethane (TPU). The hydrophobic chain extenders or polyols comprising fluorine or silicone derivatives. In embodiments of the present invention using hydrophobically-modified' thermoplastic polyurethane, the hydrophobic moieties are chemically reacted into the hard segments of the polyurethane backbone. In alternative embodiments, a portion of the original polyol may be substituted for a hydrophobically-modified variant to generate a hydrophobically modified 'prepolymer'. The prepolymer is then subsequently reacted with a normal chain extender rather than a hydrophobically derivatised version.

In each case, a thermoplastic polyurethane block co-polymer is yielded from the process, which thermoplastic polyurethane block co-polymer exhibits a two-phase microstructure. As a result of the mixing/processes, fluorine (using materials such as Fluoro-link) or silicone (Silmer-OH amongst others) is dispersed homogenously throughout the TPU, being localised predominantly in the hard, rigid segments (via the hydrophobically derivatised chain extender route) (glassy or semicrystalline domains) or in the polyol, amorphous segments if using the derivatised polyol route.

In order to investigate these two types of modified polyurethane, test materials were produced using both procedures. TPU plaques incorporating fluoroflake (termed the 'additive' protocol) at various levels (0.1 to 2%) were compared to those produced using fluoro-link (termed the 'chemically modified' protocol) as a chain extender (0.1 to 3%). Both of these materials were compared against non-modified TPU control materials.

The contact angles of the three test plaques (Fluoroflake, Fluorolink) were measured and the surface energy calculated utilizing the following equation:

$$(1+\cos(\theta))\gamma_{LV} = 2\sqrt{(\gamma_S^D \gamma_L^D)} + 2\sqrt{(\gamma_S^P \gamma_L^P)}$$

(water: $\gamma_{LV}$=72.80; $\gamma_L^D$=21.80; $\gamma_L^P$=51.00; methylene iodide: $\gamma_{LV}$=50.80; $\gamma_L^D$=50.80; $\gamma_L^P$=0)

The surface energy of all the new materials was found to be in a desired target range, between 15 to 30 mN/m, compared to the control, which was outside this value (35 mN/m).

Scanning electron microscope ("SEM") and energy dispersive X-ray analysis ("EDX") of the TPU with fluoroflake dispersed within the material proved experimentally revealing. The analysis of the produced material showed that the surface of the material was quite different texturally relative to the bulk of the material. Applicants have found that this can be explained by the fact that the bulk material contains no fluorine and the surface has a relatively large fluorine content (5%). This analysis indicates that the fluorine has localized exclusively at the surface, minimizing contact with the TPU. Effectively, the hydrophilic nature of the bulk and the hydrophobicity of the additive has produced a material where the two constituents separate from one another. This conclusion was reinforced by review of X-ray photoelectron spectroscopy ("XPS") data.

From this review, it was found that a few microns into the sample the amount of fluorine diminishes such that the bulk material, away from the surface, resembles standard. In embodiments of the present invention, where it is desirable to have properties of the standard TPU steramer skin but to have a low surface energy outer surface to which paints or coatings with high concentrates of silicon, fluorine or derivatives can be painted/attached, the additive protocol is suitable to produce streamers that are subsequently coated or painted by anti-fouling materials. A problem with the additive protocol is the control of the process. Preparation of self-supporting tubes for marine seismic streamer assembly is very different to that of producing molded plaques. However, it was found, that is some embodiments of the present invention, it is feasible to fabricate marine seismic streamers incorporating a dispersed additive. In embodiments of the present invention, cooling approaches other then spraying the TPU tube with water is used for the additive TPU to prevent reducing presence of the hydrophobic additives at the surface of the modified TPU.

Applicants have found comparison of the additive protocol, fluoroflake added to the TPU, with the chemically modified TPU, TPU with chemically integrated fluorolink, to be quite revealing. In the chemically modified TPU, the XPS and EDX data indicated that the fluorine was distributed throughout the whole sample. In fact, surprisingly there was more fluorine in the bulk of the material than on the surface. In embodiments of the present invention, this increased concentration of the additive in the bulk material is advantageous as means the streamer skim will develop a lower surface energy as it wears during use. This increase in concentration, in an embodiment of the present invention, counter-acts the increased roughness of the streamer surface that develops during use, which is also a contributing factor to fouling The silicon derived materials followed the same pattern as those observed for the fluorinated samples, i.e. the use of silylated chain extenders gives a more uniform distribution of the silicon relative to dispersing a silylated material in the polymer melt. In embodiments of the present invention, streamers made using fluoro- and silyl-chain extenders have properties very close to that of the experimental plaques.

Applicants have observed that in streamers comprising TPU chemically modified with silicon and/or fluorine, the heteroatoms are distributed throughout the streamer skin with slightly less at the surface compared to the bulk of the streamer skin. In embodiments of the present invention, the mechanical properties of the modified materials are similar to those of the non-modified streamers such that the modified skins have the properties required/desired for use in marine seismic streamers.

There are two different sets of mechanical properties important for a material used as a seismic streamer skin; the properties relating to signal transfer (transmission of seismic signals through the streamer skin) and the properties relating to the mechanical robustness of the streamer skin. Both the hardness and the stiffness of the TPU affects the signal transfer of the skins. The Shore A hardness of the modified materials is 93±7 (ASTM D2240), while the apparent modulus (found from the transitional nominal stress and strain) is in the range of 30-70 MPa (ISO 527-2).

As the streamer skin must be able to take a certain amount of abuse/wear during operational procedures, mechanical properties of the streamer skin, such as abrasion, tear and puncture resistance are important. In embodiments of the present invention, puncture impact behavior of the modified skins show a peak force higher than 2500 N and a total energy of at least 50 J (ISO 6603-2), while the tear resistance for the modified skins is higher than 80 N/mm (ASTM D624). In addition, the modified skins (both silicone and fluorine modified) in accordance with aspects of the present invention show around a 50% increase in abrasion resistance (ASTM D638-08) compared to regular TPU skins. Also, in embodiments of the present invention, the maximum tensile stress and the maximum elongation at break are improved in the modified skins compared to regular TPU skins, with up to a 20% increase in both properties (ISO 527-2).

In addition to the standardized tests, a custom made durability test was performed where a 100 meter section of streamer skin is reeled around two metal drums with an outside diameter ("OD") of 1.4 meters, at 25 kN tension for 100 cycles at −15° C. and 100 cycles at 30° C. In this test, the surface of the modified streamer skins, in accordance with embodiments of the present invention, showed minimum signs of wear after the test.

In embodiments of the present invention, application of silicon and fluorine paints (such as InterSleek 900, 970 and 737) all readily adhered to the modified, low surface energy TPU. This effective application of the paints was independent of the form of the modified TPU (i.e., tubes or plaques) and irrespective of the method used to apply the paint (brush or roller). In embodiments of the present invention, no tie coat was required as the surface energy of the modified TPU was of a level of 15 to 30 mN/m, such that the coatings and paints adhere directly to the modified TPU.

In embodiments of the present invention, anti-fouling coatings or paints are more effectively applied to a streamer skin because the skin comprises a modified TPU, where the surface energy of the streamer skin has been reduced to decrease the mismatch with the coatings and paints. Embodiments of the present invention, provide streamers skins having a surface comprising high concentrations of silicon and/or fluorine or derivates thereof, where the high concentration surfaces have a low surface energy for repelling/preventing/reducing attachment of marine organisms and providing effective coupling of the paint/coating to the streamer skin.

In some embodiments of the present invention, paints or coatings comprising silicon moieties, fluorine moieties and/ or derivatives thereof are painted onto the outer-surface of the modified TPU streamer skin. In some aspects, the streamer is skinned with the modified TPU, such as by extruding the modified TPU casing around the streamer body, and the paints or coatings are then applied to the streamer. In some aspects the paint/coating may be applied by dipping the streamer in the paint/coating, spraying the paint/coating onto the streamer and/or the like. In some aspects, the paints may be configured to have a color that may be used for visual inspection purposes and/or to make the streamer unattractive to marine organisms.

In some embodiments, the paint/coating may comprise a polymer or the like comprising silicon moieties, fluorine moieties and/or derivatives thereof. In such embodiments, the modified TPU and the paint/coating may have similar surface hydrophilic/hydrophobic properties providing for effective bonding between the paint/coating and the modified TPU streamer skin. In aspects of the present invention, the paint/coating may have a higher concentration of silicon moieties, fluorine moieties and/or derivatives thereof than exists in the modified TPU. However, Applicants have found that even with far greater concentrations in the paint/coating, the bonding between the paint/coating and the modified TPU is still much better than between the paint/coating and unmodified TPU. Moreover, in aspects of the present invention, the modified TPU that exists below the paint/coating may serve to prevent biofouling when the paint/coating flakes or delaminates.

Figure 4A:
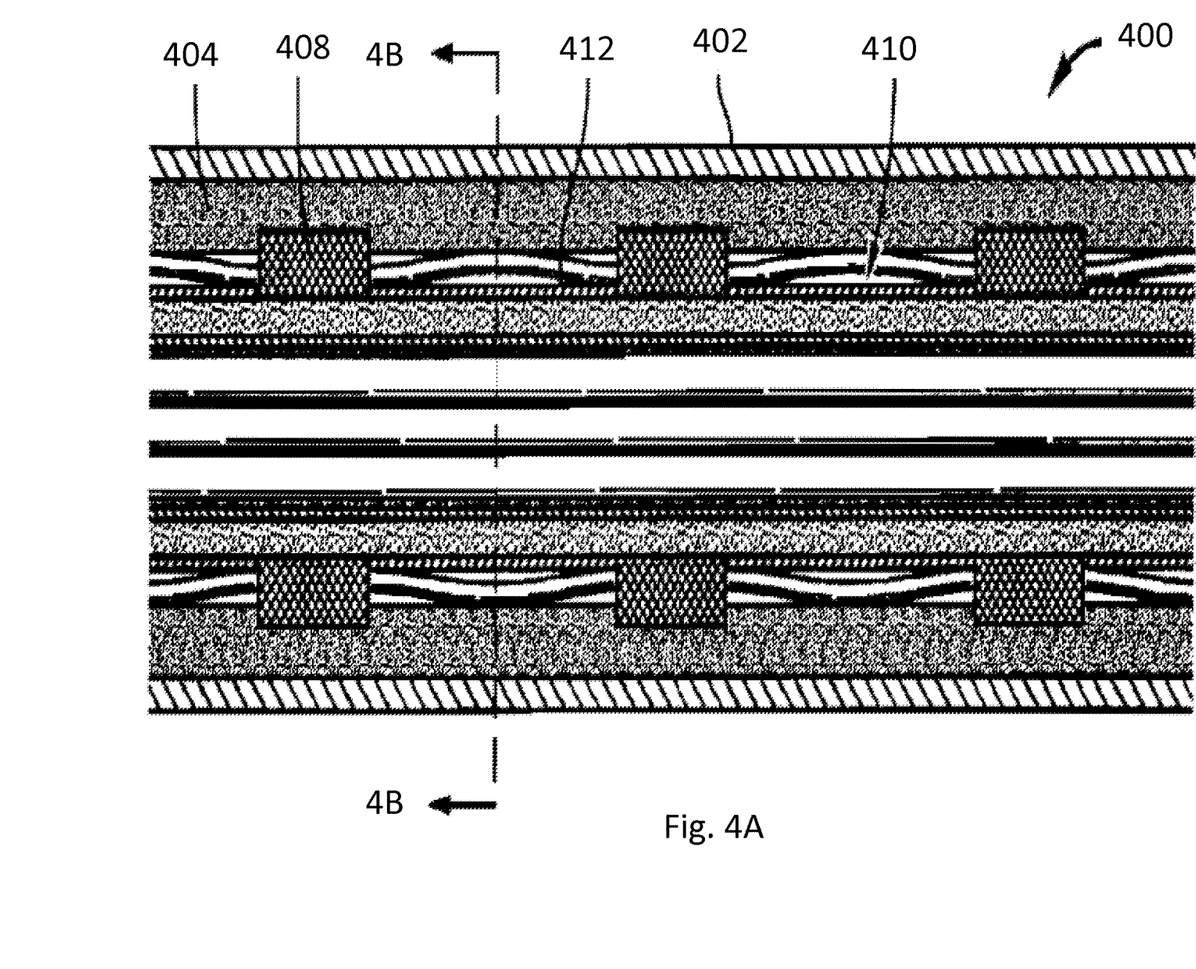
FIGS. 4A-C illustrate a solid streamer, according to one embodiment of the present disclosure.

FIG. 4A illustrates a streamer cable 400 according to one embodiment of the present invention. In an embodiment of the present invention, the streamer cable 400 comprises a streamer skin 402 that encloses a solid body 404 and one or more seismic devices 408 for use in seismic data acquisition. Seismic devices 408 may include seismic sensors (e.g., geophones, hydrophones, accelerometers and/or the like) and/or sensor electronics that generally manipulate data acquired by the seismic sensors, such as an analog to digital converter that digitizes the analog data acquired by the sensors. In practice, the seismic devices 408 may be disposed within a housing.

In an embodiment of the present invention, the solid body 404 serves as the core of the streamer and may serve as a strength member and may surround a central/inner section that may itself contain a transmission bundle (not shown). In embodiments of the present invention, the solid body 404 comprises a substantially solid material, where the term solid herein means that the material is sufficiently rigid to serve as a strength member and support the streamer structure. In practice the solid material must be flexible enough such that the streamer cable 400 can be spooled (wound around a spool) when it is deployed from a marine vessel or retrieved from the marine body.

In some embodiments of the present invention, a channel 412 is formed in the solid body 404. Referring to FIG. 4A, channel 412 provides a pathway for a wire bundle 414 to connect the various seismic devices 408 disposed within the streamer cable 400. In this embodiment, wire bundle 414 extends through the channel 412, thus providing easy access to the wire bundle for technicians to connect and/or disconnect the wires to the associated seismic devices 108. In aspects of the present invention, channel 412 may provide a pathway extending from a hollow inner core of the solid body 404 through the solid body 404 to one or more sensors (not shown) disposed within the solid body 404.

Figure 4B:
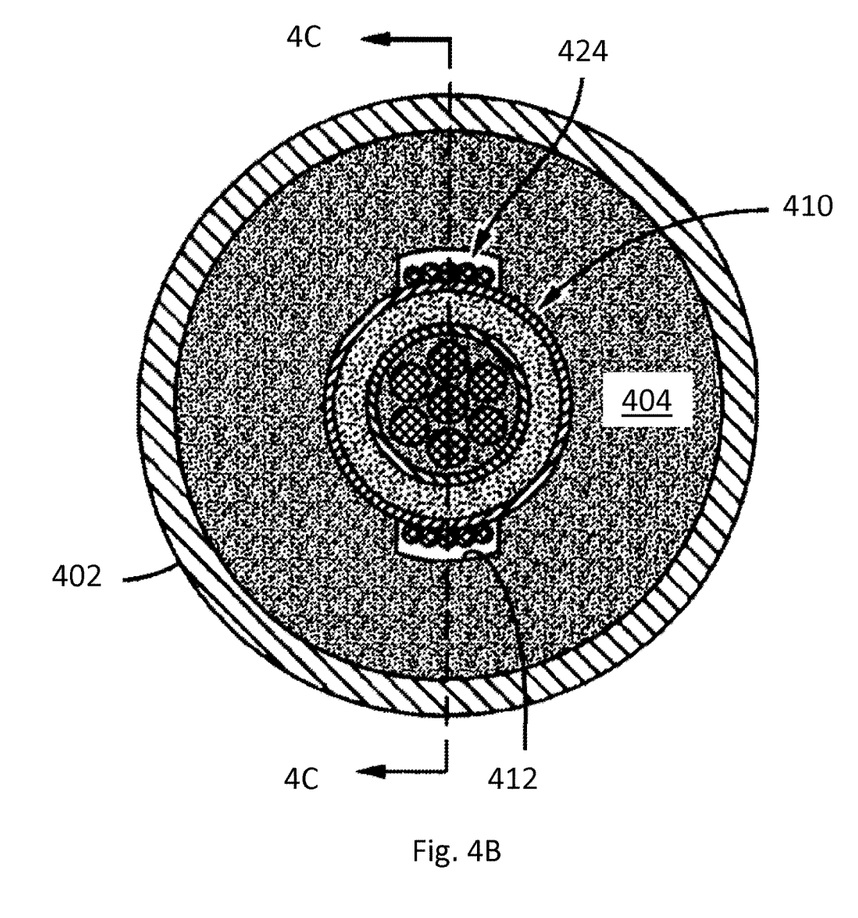

Referring to FIG. 4B, wires 414 can be formed such that they can have slack when extending through streamer cable 400. Slack may be imparted to wires 414 by ensuring that the wires are longer when straight than streamer cable 400. The additional length of wires 414 relative to the streamer cable may be referred to as "over-length." To accommodate the over-length, wires 414 may be formed to have a corrugated or S-shape when extending through the cable. In corrugated embodiments, wires 414 may be run through teethed wheels or pre-formed plates to thus impart corrugation to the wires prior to insertion within streamer cable 400. By having slack, wires 414 can withstand the various compressional or tensional loads experienced by streamer cable 400 during deployment and operation.

Additional process can be used to impart slack to wires 414. For example, with reference to FIG. 4C, slack may be imparted to wires 414 only at certain points along channel 412. To accommodate such slack, enlarged cavities, such as cavity 420, may be defined in polymer body 404 along certain portions of channel 412. Accordingly, in this embodiment, wires 414 can be substantially taut along some segments of channel 412 yet incorporate slack at enlarged cavities 420.

Figure 4C:
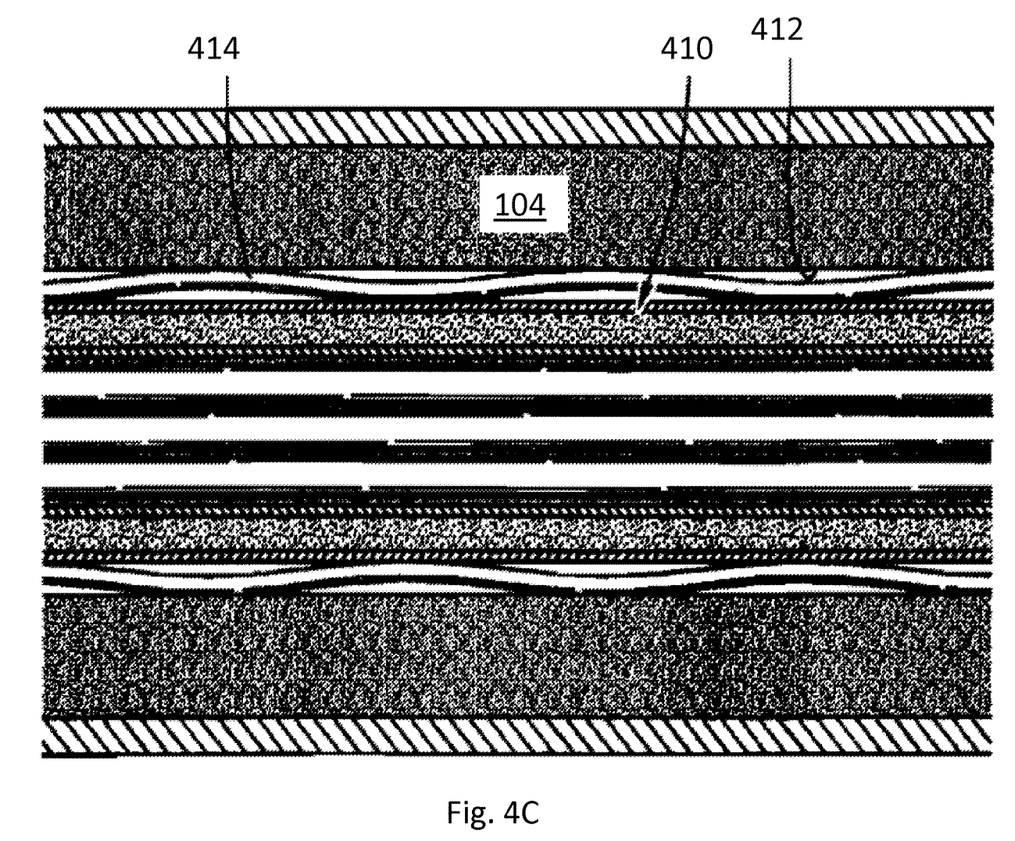

By imparting slack to wires 414, elongation or bending of the streamer cable will only impose a portion of the tensional forces experienced by streamer cable 400 onto the wires compared to the greater amount of tensional forces that would be experienced by taut wires. In practice, streamer cables are typically rolled on a spool and placed on a vessel for deployment at sea. Rolling a streamer cable on a spool can introduce undesirable bending strains, particularly with respect to solid streamer cables. Compression and tensile strain experienced by wires 114 can lead to undesirable wire breaks.

The manufacturing process associated with assembling streamer cable 400 according to the present disclosure may be simplified. In particular, by placing wires 414 through the channel 412, seismic devices 408 and wires can be connected, tested and pre-made before the step of assembling the sensors and the solid body 404 together. In one embodiment, this can be realized if the solid body 404 is manufactured in two halves (or other multiple) that are then secured together during manufacturing. In another embodiment, the sensor network (sensor 406, wires 414 and electronics 408) may be pre-assembled inside a portion of the solid body 404 and then later assembled together with core 410.

In an embodiment of the present invention, the solid body 404 comprises a solid material that provides a support structure to which the seismic devices 408, wires and/or the like may be coupled. In aspects of the present invention, the material may comprise a solid polymer a plastic and/or the like that has been manufactured to comprise hydrophobic properties. In some embodiments of the present invention, the solid body 404 may comprise a hydrophobic material such as polyethylene ("PE"), polypropylene ("PP") and polytetrafluoroethylene ("PTFE").

In some aspects, the solid body 404 may comprise one or more wells, pockets and/or the like (not shown). In such aspects, the wells/pockets in the solid body 404 may be used to contain the seismic devices 408. The wells/pockets in the solid body 404 serve as a housing for the seismic devices 408 and in some aspects, the channel 412 may be used to contain wiring linking the seismic devices 408 in the pocket/well to the transmission cables in the core of the streamer.

By way of example, the wells/pockets may contain the seismic devices 408 and be filled with a gel/liquid. In this way, the gel/liquid can be selected to have properties to provide for transmission of seismic/acoustic signals through the gel/liquid to the seismic devices 408. Merely by way of example, acoustic properties and/or the like may be matched to the marine fluid/water/salt-water that the streamer cable 100 is designed for use in. In this way, the solid body streamer of the present invention may have the sensing properties of a liquid/gel filled streamer. In some aspects of the present invention, the material filling the well/pocket may be a gel in other embodiments the material filling the well/pocket may be a fluid disposed in a pouch or the like or held in the well/pocket by a cover/lid.

In an embodiment of the present invention, the solid body 404 is covered with the streamer skin 402. The streamer skin 402 may be used to protect the interior of the streamer cable 400 and/or the like. In one embodiment, the solid body 404 may comprise a hydrophobic, solid material and the streamer skin 402 may also comprise a hydrophobic material. In such embodiments, the use of hydrophobic material for both the solid body 404 and the streamer skin 402 may provide for effectively coupling/sealing the streamer skin 402 to the solid body 404. For example, the hydrophobic streamer skin may be extruded over the solid body 404 and/or heat welded to the solid body 404. In some embodiments, the streamer skin 102 may be extruded into a tube and the solid body 404, including the sensors, wiring and/or the like may be inserted into the tube. In embodiments of the present invention, coupling, insertion, welding and/or the like of the solid body 404 with/into the streamer skin 402 is made effective by comprising both the streamer skin 402 and the solid body 404 of hydrophobic material. Moreover, in embodiments of the present invention, the hydrophobicity of both the solid body 404 and the streamer skin 402 provides an effective boundary for use in bodies of water.

In embodiments of the present invention, as described above where the seismic devices 408 are disposed within wells/pockets in the solid body 404, the streamer skin 402 may be used to cover the wells/pockets. In such embodiments, by coupling the streamer skin 402 to the solid body 404 around the wells/pockets, a fluid or a gel may be contained/sealed within the wells/pockets. For example, the wells/pockets may be filled with an oil, kerosense, an oil gel, a kerosene gel or the like.

Previously, in general, seismic streamers have been skinned with hydrophilic materials such as thermoplastic polyurethane ("TPU"). In previous systems, the streamer has been filled with a liquid/gel and the TPU has provided a rugged casing that was capable of effectively encapsulating the liquid/gel. However, as described above, in embodiments of the present invention, hydrophobic materials are used as the streamer casing. In such embodiments, the streamer casing may comprise a casing that is completely composed of hydrophobic material such that the inner surface and the outer surface of the streamer casing/skin is hydrophobic. This inner and outer hydrophobicity provides for effective coupling with the hydrophobic solid body 404 to provide a streamer with a hydrophobic outer-surface, which hydrophobic outer surface may provide for, among other things, reduced drag, prevention/reduction of biofouling by marine organisms and/or the like.

In some embodiment of the present invention, the streamer skin 402 may comprise modified TPU, where the TPU includes one or more hydrophobic moieties. In other embodiments, Applicants have found that the synergistic effect of the solid body 404 comprising a solid, hydrophobic material provides that the streamer skin 402 may comprise silicon, silicone-elastomers, PDMS and/or the like. PDMS is a material that comprises methyl (—CH3) and side chains that provide the material with a low surface energy (20-24 mJ/m2) and a flexible, inorganic —Si—O backbone linkage that results in an extremely low elastic modulus (~1 MPa).

Applicants have found that both these properties may provide for the extremely low adhesion properties of silicone coatings, which properties provide the streamers in accordance with the present invention with a low drag coefficient and/or a resistance to fouling by marine organisms. Applicants have found that in the streamers in accordance with embodiments of the present invention that comprise a solid design, the silicon/PDMS surprisingly provides an effective casing that is resilient enough to withstand the rigors of use in marine seismic surveys. In some embodiments, the silicon/PDMS is formed into a tube and used to cover sections of the streamer. In some embodiments, the silicon/PDMS is heat welded to the solid body 404.

Applicants have found that silicon, silicone-elastomers and PDMS, having a low surface energy and a low elastic modulus, can be tuned to have appropriate signal transmission properties for seismic signals. In certain aspects, the drums on which the streamers are winched in and out of the marine environment and/or the stem of the boat may be coated with a polymer substance or the like to protect the streamer skin during the winching procedure. Applicants have found that the hydrophobic streamer casings—including silicon, silicone-elastomers and PDMS—can be extruded onto a solid hydrophobic streamer core and retain properties of low surface energy and/or low elastic modulus. Applicants have found that hydrophobic materials having low surface energy and low elastic modulus provide streamer casings with a reduced drag factor and that prevent/reduce biofouling.

Figure 5:
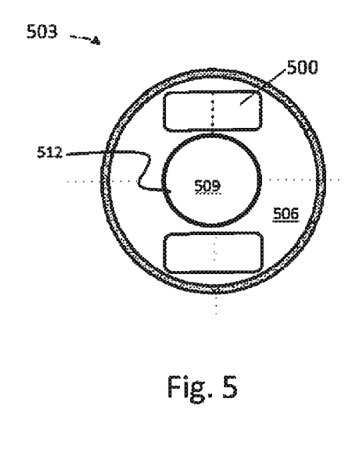
FIG. 5 illustrates a seismic sensing element disposed within a solid streamer, in accordance with an embodiment of the present disclosure.

FIG. 5 generally and conceptually illustrates how a sensing element 500 may be disposed within a solid streamer 503, in accordance with one embodiment of the present invention. The solid streamer comprises a solid central section 512 that comprises a rigid/semi-rigid material 509. The sensing element 500 may be, for example, a geophone or an accelerometer. In some embodiments, the sensing element is suspended in a fluid 503. In the illustrated embodiment, the fluid 503 is contained in a pocket 506 of the solid streamer 503. Exemplary fluids suitable for this purpose in various embodiments and known to the art and include seismic cable oil or some other suitable dielectric fluid.

The sensing element 500 is designed to match the density of the surrounding medium. To match the density of the surrounding medium, the sensing element 500 itself should be packed into a low-density material that compensate for its weight. For the illustrated embodiment, the density of the sensing element 500 is designed to match that of the fluid 503. The density of the fluids such as the fluid 303 are known quantities, or can be readily ascertained. Determination of the fluid density is within the ability of those ordinarily skilled in the art having the benefit of this disclosure. In some embodiments, the fluid 503 may comprise a mineral oil, a kerosene, a natural oil such as a citrus oil and/or the like.

In certain aspects, the fluid 503 is disposed in a container that is then put in a pocket/indent in the solid streamer body. In other aspects, the fluid 503 comprises a gel that is disposed within a pocket/indent in the solid streamer body. In an embodiment, of the present invention, a streamer skin encases the solid streamer body and the pockets/indebts in the streamer body containing the fluid 503. In embodiments of the present invention, the sensing element 503 is in sensing contact with the marine body surrounding the streamer via the fluid 503 and the streamer casing. Applicants have found that hydrophobic materials with low surface energy and/or low elastic modulus, such as silicon, PDMS and/or the like, can be configured to have good seismic signal transmission properties when used in combination with the fluid 503. Moreover, the hydrophobic streamer casing can be welded to a streamer body comprising a hydrophobic material to provide that the fluid 503 is encapsulated in a pocket/indent in the solid streamer body.

However, as is apparent from the above discussion, some streamers may be solid in construction or the sensing element 500 may be positioned in a solid material. Exemplary materials suitable for this type of embodiment may include, for example, foamed polymer material, and a polymer with added micro-spheres, or a low density plastic. In these embodiments, the sensing element 500 is designed to match the density of the surrounding medium in which the solid streamer 503 will be deployed, i.e., water. The density of the water will vary according to factors well known in the art such as salinity, temperature, and depth. Determination of the anticipated density of the surrounding medium should also be well within the ability of those ordinarily skilled in the art having the benefit of this disclosure.

The densities of the sensing element 500, the fluid 503, the water, and other such components may vary in relation to a number of factors well known to those skilled in the art. For instance, the density of the water may vary according to temperature, depth, salinity, among other factors. Note that such variation may result in selection of a sensing element 500 that does not exactly match the density of the surrounding medium. This is acceptable, although it will yield results with lesser fidelity. At some point, however, a mismatch between the density of the sensing element 500 and the surrounding medium may become sufficiently great as to nullify the reliability of the data generated.

In embodiments of the present invention, the streamer comprises a solid core having hydrophobic, low surface energy, properties that is surrounded by a streamer casing that also has hydrophobic, low surface energy, properties. This is a configuration that is much different from previous streamers where the core is often not solid and/or the casing is hydrophilic. The core may comprise a material that is strong enough to provide a housing for seismic sensors and cabling, but is sufficiently flexible to be repeatedly spooled on and off of a marine craft. In embodiments of the present invention, the fact that both the solid core and the streamer casing are hydrophobic provides for among other things improved coupling between the core and the casing, application of the casing to the core without need for treating/altering the surface of the core material, extruding the casing onto the core and/or the like. Moreover, the hydrophobic solid core provides that the casing may be formed from silicon and/or silicon derivative materials.

It has been found that the silicon and/or silicon derivative materials provide a casing that has low drag and is anti-biofouling properties. In some embodiments, a tubing/sleeve comprising the silicon and/or silicon derivative materials may be slid onto at least a section of a solid, low surface energy core, where the low surface energy provides for ease of sliding the sleeve onto the core and improved coupling between the core and the casing. In some embodiments, a first layer/casing of a hydrophobic material is applied to the hydrophobic solid core and a second layer of a further hydrophobic material is applied to the first layer. In this manner, the casing may comprise multiple layers of hydrophobic materials. For example, in some aspects, a hydrophobically modified TPU may be applied to the core and a sleeve/layer of a silicon and/or silicon derivative material may be applied on top of the hydrophobically modified TPU layer. In such an embodiment, the hydrophobically modified TPU may provide strength to a silicon and/or silicon derivative material layer.

While the principles of the disclosure have been described above in connection with specific apparatuses and methods, it is to be clearly understood that this description is made only by way of example and not as limitation on the scope of the invention.

What is claimed is:

1. A seismic streamer, comprising:
   a streamer body comprising a solid, hydrophobic material that includes silicon or fluorine moieties; and
   a streamer casing distinct from the streamer body, the streamer casing including a sleeve that encases the streamer body, and the streamer casing comprising a hydrophobic material.

2. The seismic streamer of claim 1, wherein the streamer body defines a cylinder with a hollow core.

3. The seismic streamer of claim 1, wherein the streamer body includes a material selected from the group consisting of polyethylene, polypropylene, polytetrafluoroethylene and thermoplastic polyurethane.

4. The seismic streamer of claim 1, wherein the streamer casing has a low elastic modulus.

5. The seismic streamer of claim 4, wherein elastic modulus is of the order of 1 MPa.

6. The seismic streamer of claim 2, wherein the streamer casing comprises a tube that surrounds the cylindrical streamer body.

7. The seismic streamer of claim 1, wherein at least a portion of the streamer casing is heat welded to the streamer body.

8. The seismic streamer of claim 1, wherein a seismic sensor is disposed in a pocket in the streamer body.

9. The seismic streamer of claim 8, wherein the pocket is filled with one of a fluid or a gel.

10. The seismic streamer of claim 1, wherein the sleeve comprises one of silicon or PDMS.

11. The seismic streamer of claim 1, further comprising at least one of a hydrophobic paint, a hydrophobic coating, a hydrophobic polymer covering at least a portion of the streamer casing.

12. The seismic streamer of claim 1, wherein the streamer casing includes silicon or flouring moieties.

13. The seismic streamer of claim 12, wherein the streamer casing includes a material selected from the group consisting of silicon, a silicone-elastomer, a polydimethylsiloxane and a thermoplastic polyurethane.

14. The seismic streamer of claim 1, wherein the hydrophobic material of the streamer body includes a fluorinated chain extender.

15. The seismic streamer of claim 14, wherein the hydrophobic material of the streamer body includes thermoplastic polyurethane that includes the fluorinated chain extender.

16. The seismic streamer of claim 1, wherein a bulk of the streamer body includes the hydrophobic material.

17. The seismic streamer of claim 1, wherein a surface of the streamer body includes the hydrophobic material.

18. The seismic streamer of claim 1, wherein a bulk and a surface of the streamer body includes the hydrophobic material.

19. A method of manufacturing a seismic streamer, the seismic streamer comprising:
   a streamer body comprising a solid, hydrophobic material that includes silicon or fluorine moieties; and
   a streamer casing distinct from the streamer body, the streamer casing including a sleeve that encases the streamer body, and the streamer casing comprising a hydrophobic material; the method comprising extruding the streamer casing over the streamer body.

20. A method of manufacturing a seismic streamer, the seismic streamer comprising:
   a streamer body comprising a solid, hydrophobic material that includes silicon or fluorine moieties; and
   a streamer casing distinct from the streamer body, the streamer casing including a sleeve that encases the streamer body, and the streamer casing comprising a hydrophobic material; the method comprising:
   extruding the streamer casing into a tube; and
   inserting the streamer body into the extruded tube.

\* \* \* \* \*